…

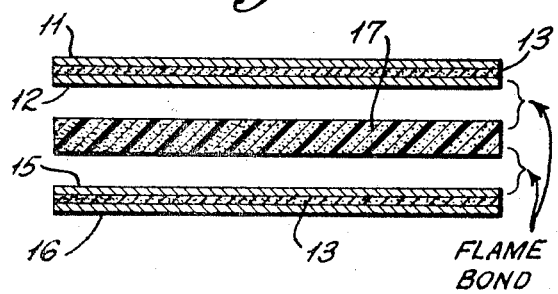
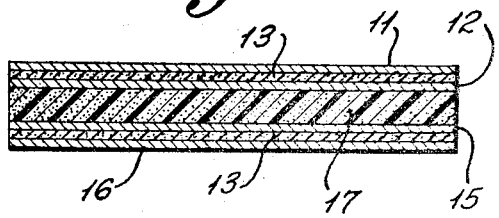
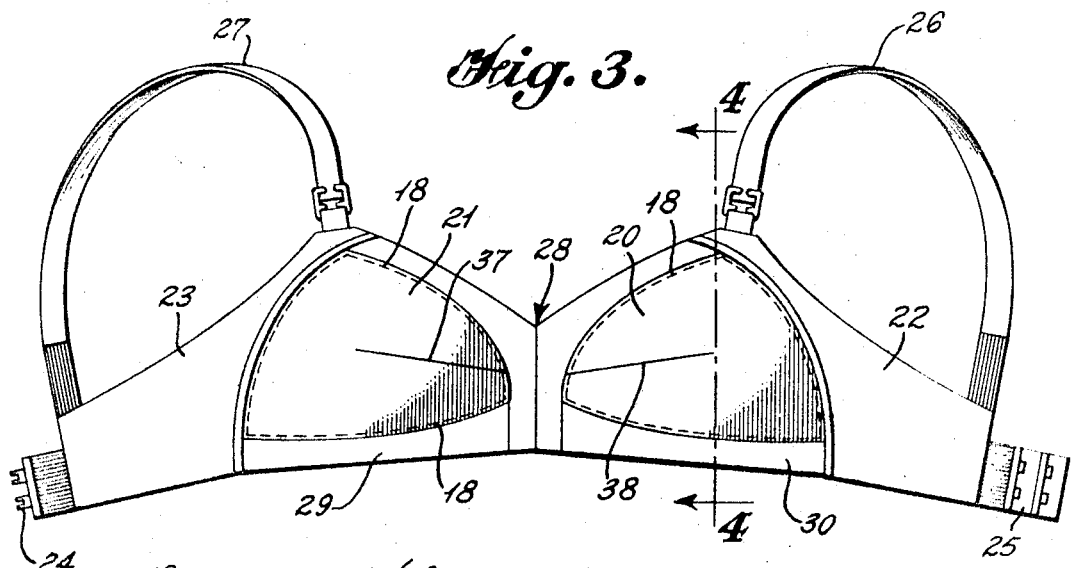
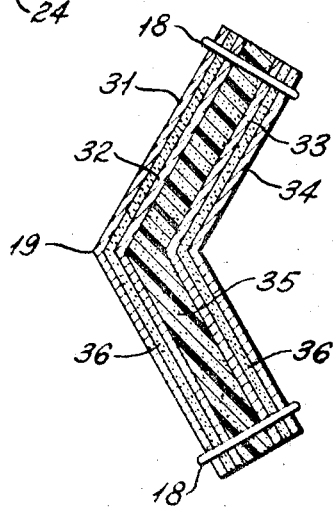
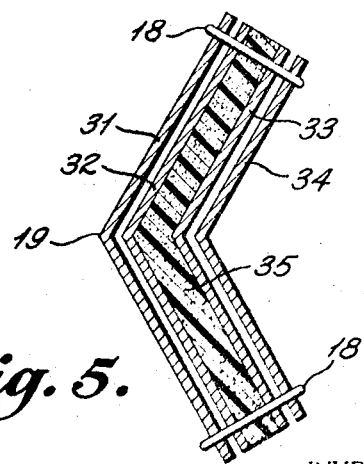
INVENTOR
Charles M. Sachs

United States Patent Office 3,574,105
Patented Apr. 6, 1971

3,574,105
LAMINATED STRUCTURE AND METHOD OF MAKING SAME
Charles M. Sachs, Fort Lee, N.J., assignor to International Playtex Corporation
Original application Apr. 18, 1963, Ser. No. 273,988, now Patent No. 3,266,495, dated Aug. 16, 1966. Divided and this application Nov. 2, 1965, Ser. No. 554,227
Int. Cl. B32b 5/18, 3/06, 3/12
U.S. Cl. 161—51      12 Claims

ABSTRACT OF THE DISCLOSURE

A laminated structure and method of making the same, especially useful for the breast cups of a brassiere, comprising a layer of resilient polyurethane foam permanently bonded to a first porous fabric layer, and a second porous fabric layer attached at its edges to, but separated over its major area from the first fabric layer by an air space. Initially, the two aforesaid fabric layers are united by a water-soluble adhesive which dissolves away under a washing treatment.

---

The present invention is a laminated structure for use in brassieres and other articles and a method of making same.

This is a division of application, Ser. No. 273,988, filed Apr. 18, 1963, now U.S. Pat. 3,266,495 patented Aug. 16, 1966.

In the brassiere industry there is a definite market for padded brassieres to fill out the under-developed female form. Many materials have been suggested as padding including foams made from natural and synthetic rubber but these have not been completely satisfactory because they are not porous enough and become too hot upon prolonged wear. They have been unsatisfactory also in not being able to withstand machine washing and such brassieres have been recommended for hand-washing only. Foams made of polyurethane are resilient, light, porous and durable enough to withstand machine washing but suffer from a defect of their own which has severely limited their use, particularly in brassieres. This defect is their pronounced tendency to discolor badly upon aging and exposure to light. Efforts to minimize this undesirable quality have heretofore been unsuccessful.

The present inventor has unexpectedly discovered how to obviate this disadvantage of polyurethane foam to obtain brassieres which have the proper hand and feel, are porous and machine-washable, and whose original color is not influenced by any discoloration of the polyurethane foam.

In accordance with the present invention a composite fabric is produced which is comprised essentially of a first fabric lamination of two or more layers of porous fabric glued together with a water-soluble adhesive; a second fabric lamination similarly produced; and a sheet of resilient porous polyurethane foam bonded between the two aforesaid fabric laminations. This structure is porous, machine washable and retains its original color without discoloring. Composite fabrics of this type provide distinct advantages for making brassieres.

A more detailed description of the present invention may be had upon reference to the accompanying drawing wherein:

FIG. 1 is an exploded diagrammatic view showing the arrangement of the various elements;

FIG. 2 is a diagrammatic view of the finished, bonded composite fabric;

FIG. 3 is a front elevation of a brassiere provided with the composite fabric according to the invention;

FIG. 4 is an exaggerated diagrammatic view along line 4—4 of FIG. 3 before the brassiere has been washed;

FIG. 5 shows the same exaggerated view of FIG. 4 after the brassiere has been washed and the water-soluble adhesive dissolved away.

In the drawing where one embodiment of the invention is illustrated, FIG. 1 shows a first fabric combination of two layers of fabric 11 and 12 bonded with a layer of water-soluble adhesive 13. A second fabric combination of two fabric layers 15 and 16 also have a bonding layer of water-soluble adhesive 13. Each of these two fabric combinations may be prepared by known methods of lamination. For example, the adhesive may be spread upon the top surface of fabric 12 by roller, spray, knife or other technique etc. and the second fabric 11 placed upon the exposed adhesive layer and the whole united by means of heat, pressure or a combination of both. A similar process may be used to laminate the two fabric layers 15 and 16. When these two parts are completed, they are bonded to either side of the polyurethane foam 17 by means available to the art including heat or adhesives which form porous bonds when dry. A presently preferred method is the use of heat or flame lamination as described in U.S. Pat. 2,957,793. In flame lamination the polyurethane foam sheeting is exposed to a gas flame which melts a thin surface layer of the foam to make it tacky. The foam is then slightly cooled by passing it over a cold roller and fed simultaneously with the first fabric combination into a nip roller which forces the two materials together, creating a firm and lasting bond. When this has been completed, the other surface of the foam is similarly heated and bonded to the second fabric combination. The finished composite fabric as shown diagrammatically in FIG. 2 is then ready to be cut into suitable shapes and assembled into brassieres or other articles of clothing.

The brassiere shown in FIG. 3 comprises breast cups 20, 21, two back portions 22, 23, with hooks 24 and eyes 25 and two shoulder straps 26, 27. The central portion 28 contains the two cups and front panels 29, 30 which may or may not be elastic. The breast cups each comprise a porous outer fabric layer 31, a second porous fabric layer 32 flame bonded to a polyurethane foam layer 35, an inner porous fabric layer 33 flame bonded to the inner surface of the foam, and an innermost porous fabric layer 34. Fabric layers 31 and 32 may be arranged with the warp threads of one fabric parallel with or angularly disposed to the warp threads of the other and may advantageously be tricot. All of these layers are full fashioned with a central high point 19 by virtue of darts 37, 38. Peripheral stitching 18 holds the cup assembly in permanent position. That is, the stitching 18 serves as a permanent peripheral securement of the individual fabric layers about the edges of the cup. These stitches define a relatively large enclosed area. When the water soluble adhesive is dissolved an enclosed air pocket will be provided between the individual fabrics within the stitched enclosed area. FIG. 4 shows in exaggerated diagrammatic view of the finished brassiere where the water-soluble adhesive 36 uniting the fabric layers 31, 32 and 33, 34, is still present. FIG. 5 shows the same exaggerated diagrammatic view of the brassiere after it has been washed and the water-soluble adhesive has been dissolved away. A distinct advantage of the invention is that the original smooth contour of the breast cups is essentially maintained after the brassiere has been washed. It is to be noted that the bond between the polyurethane foam and fabric layers 32 and 33 remains intact and is not disturbed by the water-washing whereas fabric layers 31 and 34 have become delaminated from layers 32 and 33 respectively.

The delamination of the outer layers results in a small air space between layers 31 and 32 and between layers 33 and 34 so that layer 31, for example, stands away from layer 32. It is a noteworthy feature of the invention that any discoloration which the polyurethane foam may undergo upon aging or exposure to light does not become noticeable. It may be theorized that the discoloration of the foam is not strong enough to show through the slight air space between layers 31 and 32 and 33 and 34 or that the discoloration is absorbed by the immediately adjacent, permanently bonded fabric layers 32 and 33, but regardless of theory it is a fact that brassieres made according to the invention are highly desirable because of the avoidance of unwanted color.

Any fabric which is porous may be used, whether stretchable or non-stretchable. In a commercial method by which the fabrics are flame laminated to the polyurethane foam, a certain amount of elongation of the foam occurs while it is soft and tacky. Stretchable fabrics are preferred in this instance since they are able to accommodate to the elongation and subsequent retraction of the foam and thus avoid the puckering and creasing which would otherwise occur with non-stretchable fabrics. Examples of suitable stretchable fabrics are knitted fabrics including tricot and jersey, Helanca, stretchable cotton fabrics, elastic fabrics containing rubber, and the like. Instead of the flame lamination process, the fabrics may be bonded to the foam with permanent glues. With this method no appreciable stretching or contracting of the foam occurs and non-stretchable fabrics may be suitably used. The glues may be applied by roller, spray, knife or other technique known to the art and should be those which form a porous bond so that the desired porosity of the finished composite fabric is maintained. For purely decorative purposes an additional layer of fabric such as lace may be used with the composite fabric as an outer covering. There would thus be used, for example, an outer part of lace-tricot-tricot laminated with water-soluble adhesive prior to being flame bonded to the polyurethane foam.

As mentioned earlier the water-soluble adhesive may be coated on the full area of the fabric. For purposes of economy and to facilitate the obtaining of proper hand and feel, it is presently preferred to apply the water-soluble adhesive in spaced or discontinuous areas. These areas may be of any desired size and arranged in any desired manner. They may be as small as $1/16''$ dots of adhesive approximately $1/8''$ or more apart. The adhesive may be applied in spaced spots by known means including a roll having spaced protuberances, contacting the fabric with a smooth roll dipping in adhesive, superposing another layer of fabric on the adhesive surface of the coated fabric and consolidating the laminated structure by means of pressure rolls, with or without the use of heat. The water-soluble adhesive may be applied in the form of dots, diamonds, squares, strips or any desired design.

Water-soluble adhesives which dissolve under the influence of water may be made from gelatin, casein, vegetable proteins such as soya proteins, mucilage, starch, agar, pectin, gums such as gum arabic and gum tragacanth, water-soluble cellulose compounds such as carboxymethyl cellulose, methyl cellulose, etc. and water-soluble synthetic resins. The latter class include sodium polyacrylate, polymethacrylic acid, sodium and ammonium salts of maleic acid copolymers, polyvinyl alcohol, and the like. The adhesives may be used with plasticizers and softening agents if desired. The above recitation of suitable adhesives is not to be taken as complete since these will suggest other water-soluble adhesives to the person skilled in the art.

Urethanes are chemical compounds containing the grouping

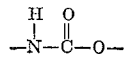

and polyurethanes are polymeric compounds containing more than one such grouping. The base materials used to form the polyurethane structure vary widely as to chemical composition and molecular structure and the physical characteristics vary widely also, depending on the basic compounds used and their specific inter-reactions. Polyurethanes as a group are outstanding in toughness, resiliency and abrasion resistance. One method of preparing these materials involves the reaction of diisocyanates on essentially linear polyester resins having terminal OH groups, which can be made from alcohols and carboxylic acids well known to the art, for example ethylene glycol, propylene glycol and adipic acid. Polyethers are another class of materials which may be used to prepare polyurethane foams. They may be prepared from polyglycols such as polyethylene glycol, polypropylene glycol, polybutylene glycol, polyoxyethylene glycol and the like. A fuller discussion of polyurethanes may be found in German Plastics Practice by De Bell et al. 1946 and U.S. Pats. 2,284,896, 2,292,443, 2,333,639 and 2,374,163. In certain types of polymer formation carbon dioxide gas is evolved as a byproduct of the reaction and this property has been utilized to create the cellular structure of polyurethane foam which may have as high as 30 to 40 times the volume of the starting material.

The invention has been shown in but one embodiment and it is obvious to those skilled in the art that it is not so limited but is susceptible of various changes and modifications without departing from the spirit and scope of the claimed invention.

I claim:

1. A porous laminated composite fabric structure adapted for use in products requiring a relatively large enclosed air pocket between individual fabric layers, comprising a first lamina of at least two layers of stretchable, porous fabric bonded together over substantially their entire surface with water-soluble adhesive and permanentaly secured to each other about the periphery of a relatively large enclosed area, a second lamina of at least two layers of stretchable porous fabric similarly bonded and a layer of porous resilient polyurethane foam permanently bonded between the two fabric laminae.

2. The laminated structure of claim 1 in which the adhesive is a polyacrylate, the first fabric lamina comprises an outer layer of decorative lace, an inner layer of tricot and an innermost layer of tricot, the polyurethane is prepared from a polyether and the second fabric lamina comprises two sheets of tricot.

3. The laminated structure of claim 1 in which the adhesive is present in discontinuous areas.

4. The process of making a porous, machine-washable laminated fabric laminate-foam-fabric laminate structure with an enclosed air pocket between the fabric lamina which comprises:

forming a first laminate of at least two sheets of porous fabric joined together with a water-soluble adhesive;

forming a second laminate of at least two sheets of porous fabric joined together with a water-soluble adhesive;

inserting between said first and second laminae an intermediate layer of porous, resilient polyurethane foam;

permanently bonding said intermediate polyurethane foam layer to the nearby surfaces of said first and second laminates facing same to form a composite structure; and permanently securing said fabric laminae to said intermediate foam layer about the periphery of a relatively large enclosed area in a manner serving to maintain such pheripheral securement of the fabric laminae to said intermediate foam layer under conditions dissolving said water-soluble adhesive, thereby providing a laminate which when subjected to a water treatment dissolves the water-soluble adhesive between the sheets of the fabric layer laminates, while retaining the peripheral bond between the intermediate foam and nearby surfaces of the fabric laminae to provide an enclosed air pocket between the individual sheets of the laminae.

5. The process of claim 4 in which the polyurethane foam is prepared from a polyester.

6. The process of claim 4 in which the water-soluble adhesive for uniting the sheets of both laminates is a polyacrylate.

7. The process of claim 4 in which the fabrics are stretchable and the foam is bonded to the two fabric laminae by means of heat.

8. The process of claim 7 in which the heat is provided by a flame.

9. The process of uniting at least two first layers of porous, stretchable fabric with water-soluble polyacrylate adhesive to form a first fabric laminae, similarly uniting two second layers of porous, stretchable fabric to form a second fabric laminae, permanently securing the resulting first and second fabric laminae, respectively, to the opposite faces of an interposed layer of porous, resilient polyurethane foam, and permanently securing the fabric layers of each laminae about the periphery of a relatively large enclosed area to form a composite structure which is porous, machine-washable and non-discoloring, and includes a dissolvable bond between the individual stretch fabrics of each laminae with the layers being permanently secured together about the periphery of the enclosed area.

10. The process of claim 9 in which the first fabric lamina comprises an outer layer of decorative lace, an inner layer of tricot fabric and an innermost layer of tricot fabric.

11. A porous, machine-washable laminated structure comprising a layer of porous resilient polyurethane foam permanently bonded to a first stretchable porous fabric over substantially its entire surface area, and a second stretchable porous fabric separated over its major surface area from said first fabric, and said second fabric permanently secured to said first fabric along the outer edges of said first and second fabrics.

12. A brassiere having a porous, machine-washable cup comprising a layer of porous resilient polyurethane foam permanently bonded to porous fabric and a second porous fabric separated from the permanently bonded fabric by a small air space.

References Cited
UNITED STATES PATENTS

| | | | |
|---|---|---|---|
| 2,921,457 | 1/1960 | Evans | 161—ISO |
| 2,789,099 | 4/1957 | Rife et al. | 260—29.6H |
| 3,257,262 | 1/1966 | Epstein | 161—89 |
| 2,981,954 | 5/1961 | Garbellano | 161—89X |
| 2,957,793 | 10/1960 | Dickey | 156—82 |
| 2,727,278 | 12/1955 | Thompson | 264—45 |
| 2,648,619 | 8/1953 | Alderfer | 161—164X |
| 2,495,167 | 1/1950 | Horstmann et al. | 156—155X |

ROBERT F. BURNETT, Primary Examiner

M. A. LITMAN, Assistant Examiner

U.S. Cl. X.R.

156—155, 82, 93; 161—89, 95, 160, 148, 159